Aug. 24, 1948.  C. E. ROWE  2,447,716
METHOD AND APPARATUS FOR CARBONATING
LIQUIDS USED FOR DRINKING
Filed May 3, 1946
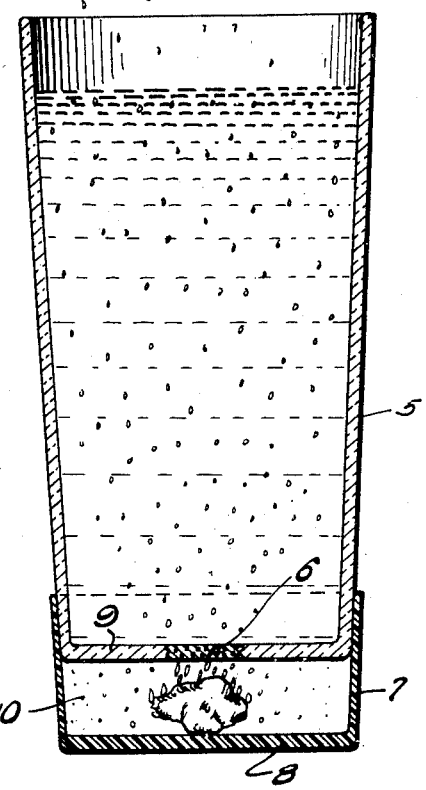
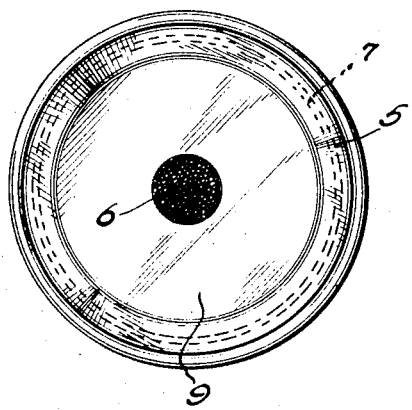
Inventor
CHARLES E. ROWE Patented Aug. 24, 1948

2,447,716

UNITED STATES PATENT OFFICE 2,447,716

METHOD AND APPARATUS FOR CARBONATING LIQUIDS USED FOR DRINKING

Charles E. Rowe, Corydon, Ind., assignor of one-third to S. Morris Wilson, Corydon, Ind.

Application May 3, 1946, Serial No. 667,016

3 Claims. (Cl. 62—91.5)

This invention relates to the production of carbonated liquids used for drinking purposes and it has for its main object to provide a method and means for carbonating the liquid within the drinking glass or drinking vessel, for keeping it carbonated for some time and for carbonating liquid added thereto.

This method, as seen, will dispense with the necessity of carbonating liquids and especially water in large quantities and of storing them in tightly sealed bottles from which they are poured for consumption purposes. These methods have many disadvantages and require the use of complicated sales organizations, which need not be described.

Many methods and apparatus have been suggested for carbonating liquids in small quantities for table use but they all require relatively complex carbonating means and pouring of the carbonated liquid into a drinking vessel, an operation which will result in such a loss of the carbon dioxide that the liquid not consumed immediately loses its sparkling character.

The invention consists in a method and means for carbonating liquids within the vessel used for drinking purposes and for keeping the liquid and added liquid carbonated for an extended period of time. According to the invention a drinking vessel is used provided with a porous wall portion, preferably with a bottom portion containing a disk of porous glass, and this vessel cooperates with a Dry Ice container, so shaped that it is closed and sealed by that portion of the drinking vessel which contains the porous section. If solidified carbon dioxide (so-called Dry Ice) is placed within the said Dry Ice container, the carbon dioxide developed by evaporation will be able to penetrate into a liquid filled into the drinking vessel and will keep this liquid carbonated. This process will continue as long as the quantity of Dry Ice will last.

It is thus seen that carbonated water or other carbonated liquids may be produced by very simple means which, in addition to the advantages of producing the carbonated liquid in the quantity required, have many further advantages over the known methods.

The invention is illustrated in the accompanying drawing showing one embodiment thereof. It is, however, to be understood that this specific embodiment forms an example intended to serve the purpose of explanation. The invention is described in such terms that the principles used will be readily understood and the application of such principles to other embodiments is, therefore, not a departure from but a part of the invention.

In the drawing:

Figure 1 is an elevational sectional view of the carbonating arrangement used.

Figure 2 is a plan view of said arrangement.

According to the invention, a drinking glass, cup, bowl or similar container 5 may be used, into the bottom portion 9 of which a small disk 6 of so-called porous or sponge glass has been fused. The drinking glass, cup or bowl may be made of glass or of any other material permitting the insertion of the disk and, while fusing is a preferred method, the said disk may also be fixed by means of a cement, such as used for lenses or the like, or by mechanical means such as screw threads.

The porous glass disk consists of a particular type of foam glass which is usually called glass sponge, spongy glass or porous glass, such as manufactured, for instance, by the Corning Glass Works of Corning, New York. In this type of glass the fine pores of the foam glass intercommunicate so that it is permeable for gases.

The drinking glass, cup or bowl 5 preferably tapers or may be slightly conical and it fits tightly into the upper portion of a coaster 7 or of a similar receptacle whose upper portion is shaped correspondingly. The coaster holds the drinking glass, cup or bowl at some distance above its own bottom 8 so that a gas tight chamber 10 is formed between the coaster 7 or Dry Ice vessel and the bottom 9 of the glass, cup or bowl 5 when the latter is placed on the former.

The conical or tapering shape of the drinking glass permits easy removal and tight fitting of the glass, cup or bowl within the Dry Ice vessel without special attention.

Into the chamber 10 a piece of so-called Dry Ice which consists of solidified carbon dioxide is placed, while the glass 5 is filled with the desired quantity of drinking liquid, which may be either water or any other liquid. Practically no liquid leaks through the porous glass, but the gaseous carbon dioxide, developing in the chamber 10, will soon have acquired the required pressure to overcome the pressure of the liquid at the bottom of the glass and to penetrate into it. The gaseous carbon dioxide then traverses the column of liquid in the drinking glass, cup or bowl 5 and is partly absorbed and partly mechanically retained therein.

The liquid in the glass, cup or bowl is thus sufficiently carbonated for drinking purposes within a very short period.

The extent to which the carbonating of the liquid occurs under given temperature conditions depends partly on the nature and partly on the diameter of the porous glass disk and partly also on the size of the chamber in which the Dry Ice is kept. Evaporation of the Dry Ice exercises a cooling action on the drinking glass and on the liquid therein. This cooling action, as well known, also retards evaporation of the Dry Ice in the chamber so that the evaporation process will proceed slowly and the carbonating of the liquid continues for a protracted period. This period may be roughly regulated by using suitable quantities of Dry Ice in the chamber 10, so that the liquid may be kept carbonated or fresh liquid filled into the glass from time to time may be carbonated for the period of time during which refreshment will be required.

The invention has been described partly in specific terms but it is obvious to the expert that certain details and steps may be changed, while the result and the principle used remain unaffected by such changes.

I claim:

1. A method for carbonating liquids used for drinking purposes within a drinking vessel provided with a porous wall portion, which consists in placing the liquid to be carbonated into the drinking vessel and in subliming carbon dioxide from Dry Ice within a chamber closed by the wall of the drinking vessel containing the porous portion.

2. An apparatus for carbonating liquids used for drinking purposes, which comprises a drinking vessel having a wall provided with a porous glass disk and a Dry Ice vessel into which the drinking vessel removably fits and forms therewith a chamber closed by the said drinking vessel, said chamber being adapted to receive pieces of Dry Ice for developing the carbon dioxide used for carbonating.

3. An apparatus for carbonating drinking liquids comprising a drinking vessel with a bottom portion partly consisting of porous glass, said vessel having a portion tapering towards the bottom portion and an open Dry Ice container having an upper portion removably receiving and tightly closed by the said tapering bottom portion of the drinking vessel so as to form a sealed chamber for Dry Ice between it and the bottom portion of the drinking vessel.

CHARLES E. ROWE.

REFERENCES CITED

The following references are of record in the file of this patent:

UNITED STATES PATENTS

| Number | Name | Date |
|---|---|---|
| 1,889,111 | Serr | Nov. 29, 1932 |